O. F. BALTZLEY.
DISPLAY MACHINE.
APPLICATION FILED SEPT. 20, 1920.

1,409,516.

Patented Mar. 14, 1922.
6 SHEETS—SHEET 4.

Inventor
Oren F. Baltzley
by
Wm. H. Sincical
Attorney

O. F. BALTZLEY.
DISPLAY MACHINE.
APPLICATION FILED SEPT. 20, 1920.

1,409,516.

Patented Mar. 14, 1922.
6 SHEETS—SHEET 5.

Inventor
Oren F. Baltzley
by
Wm H. Fincuel
Attorney

UNITED STATES PATENT OFFICE.

OREN F. BALTZLEY, OF HAGERSTOWN, MARYLAND.

DISPLAY MACHINE.

1,409,516. Specification of Letters Patent. Patented Mar. 14, 1922.

Application filed September 20, 1920. Serial No. 411,372.

*To all whom it may concern:*

Be it known that I, OREN F. BALTZLEY, a citizen of the United States, residing at Hagerstown, in the county of Washington and State of Maryland, have invented a certain new and useful Improvement in Display Machines, of which the following is a full, clear, and exact description.

This invention is in the nature of a machine for displaying or exhibiting advertising signs, pictures or other objects, and is designed for use particularly in public places for displaying a number of advertisements by the same or different advertisers.

The invention consists of a series of trunnioned frames adapted to receive any suitable advertisement, sign, picture, or other thing to be displayed, and preferably made transparent so that it may be illuminated and thus rendered more conspicuous, which are arranged on substantially parallel racks, and mechanism for taking the rearmost frame from the lower rack and transferring it to the upper rack and moving the forward frame on the upper rack into exhibiting position and then causing it to be discharged onto the lower rack at its front, and so on successively exhibiting the advertisements or other objects one after another; the movements being effected by and under the control of an automatic power mechanism, as I will proceed now to explain and finally claim.

In the accompanying drawings illustrating the invention, in the several figures of which like parts are similarly designated, Figure 1 is a front elevation, some of the near portions being broken out to expose other portions in the rear. Fig. 2 is a front elevation, and Fig. 3 is a side view of one of the transfer latches.

Figures 1, 2, 3:
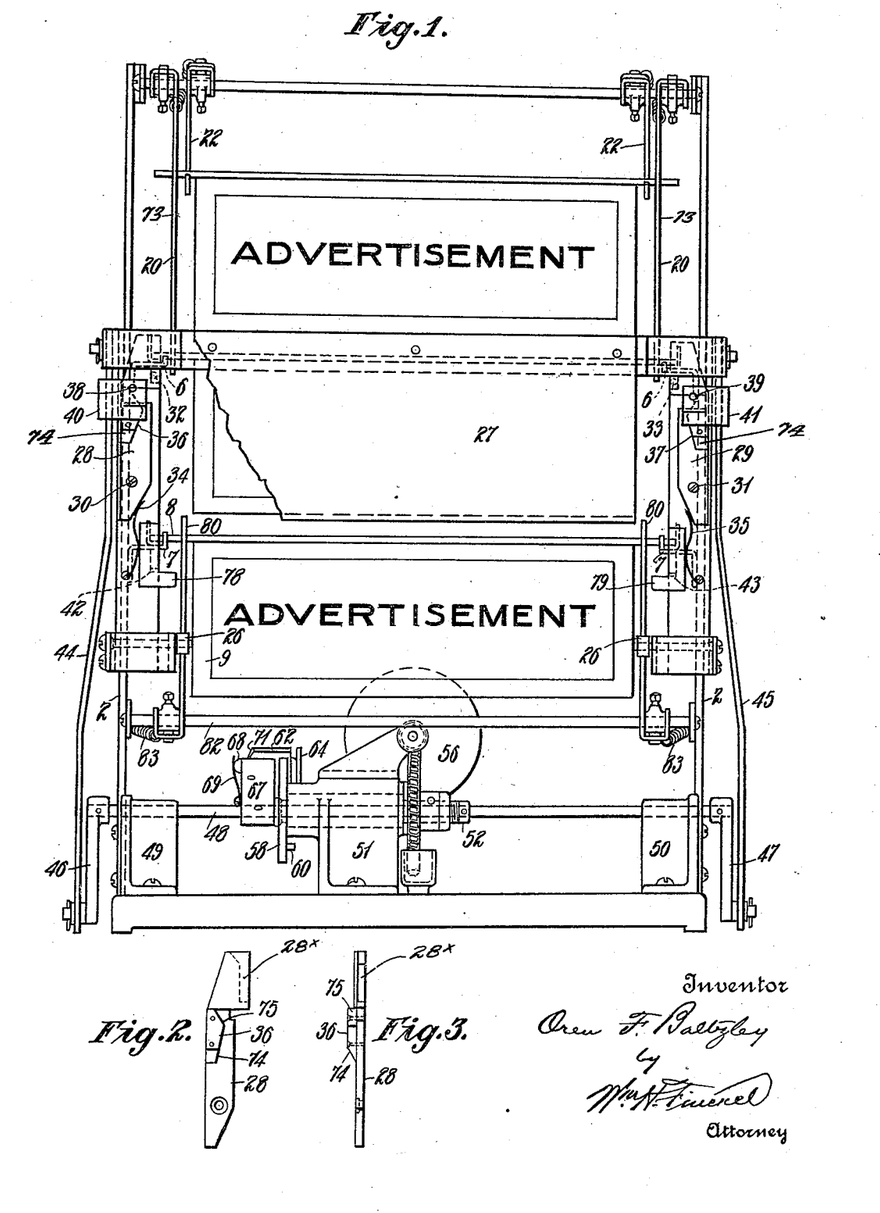
Figure 4:
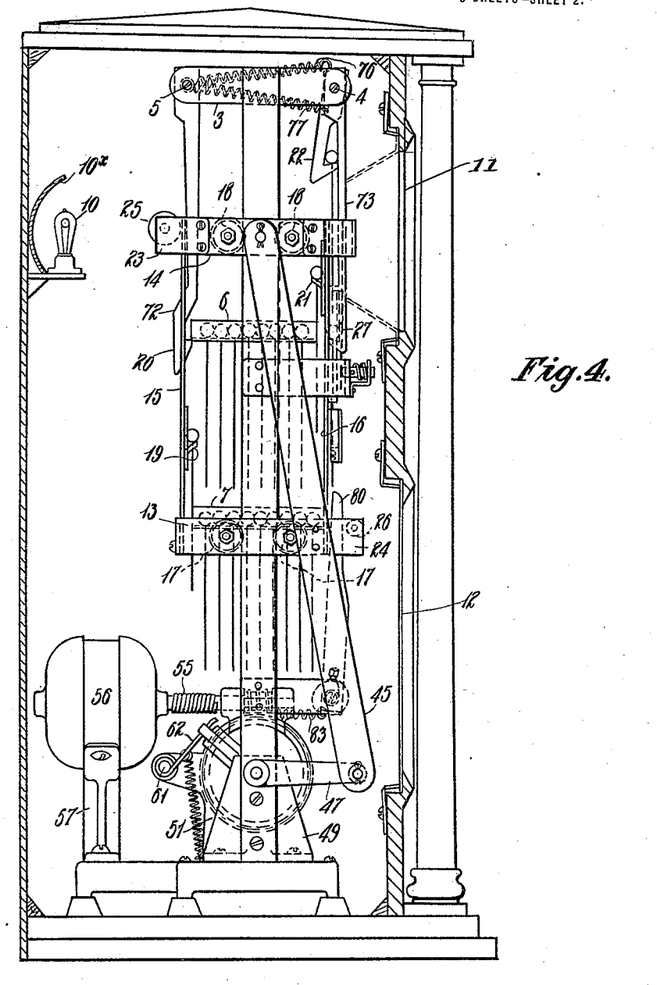
Fig. 4 is a side elevation of the machine with the inclosing casing in section.

The machine frame comprises a base 1 on which are erected the uprights 2 having the cross-pieces 3 at the top which are connected by rods 4 and 5 running from side to side of the machine. 6, 6 and 7, 7 are pairs of racks secured to the uprights one above the other and adapted to receive trunnions 8 of display frames 9, which last are adapted to receive any matter to be displayed, such as advertisements, signs, pictures, and the like, preferably of transparent or translucent material to be illuminated as from a lamp or lamps 10 and reflector or reflectors $10^x$ placed behind them in a casing in which the whole is enclosed, as indicated in Fig. 4, said casing having a display opening 11 through which the display objects may be exposed to view. This casing may also have an opening 12 to receive a panel more or less ornamental or capable of being utilized for commercial purposes.

A carriage is provided, composed of the horizontal pieces 13 and 14 connected by the uprights 15 and 16, arranged at back and front respectively, and this carriage has its members 13 and 14 provided with wheels 17, 17 and 18, 18, which engage the edges of the uprights 2, 2 and permit the carriage to have vertical movement upon said uprights. The members 15 have catches 19 which as the carriage passes the lower rack containing the display frames, engage the trunnions of the rearmost frame and in the further upward movement of the carriage, as hereinafter explained, come into contact with the cam-shaped hooks 20 which displace the frame on the catches and transfer it to the upper rack in the rear of any frames in that rack, so as to press forward the series of display frames contained in said upper rack. The members 16 likewise are provided with catches 21 arranged thereon at a higher point than the catches 19, equal to the distance between the racks, so that in the movement of the carriage the display frame will have been taken from the front of the upper rack and lifted into position to be engaged by the cam-shaped hooks 22. Roller-holders 23 and 24 are arranged respectively on the rear and front portions of the carriage members 14 and 13. A shutter 27 is fastened to and travels with the carriage, as presently explained. Latches 28 and 29 are pivoted at 30 and 31 on the uprights 16 and have their upper ends held against stop pins 32 and 33 by springs 34 and 35 pressing upon their lower ends substantially below their pivots, and are provided with cams 36 and 37 which serve to effect the lowering of the display frames. As will be understood, these latches are ad-ranged at the front of the machine. When the latches 28 and 29 are caused to move outwardly the carriage is lifted, by means of the upper angles (hereinafter designated 75) of their cams 36 and 37 coming into contact with the spring pins 38 and 39 which are held in brackets 40 and 41, which are rigidly secured to the uprights 2. As already stated, the display frame catches 19 and 21 form parts of the carriage and serve the purpose of elevating the display frames. Pockets 42 and 43 on the carriage serve the purpose of lowering the display frames.

The carriage is connected at its upper end by rods 44 and 45 with cranks 46 and 47 on a shaft 48, which is mounted in bearings 49 and 50 on the base 1. Between these bearings 49 and 50 is another bearing 51 in which is mounted a quill or sleeve 52 through which the shaft 48 passes freely. This quill or sleeve carries a worm-wheel 53 engaged by a worm 54 connected, as by a flexible coupling 55, with any suitable motor, indicated at 56, erected on a stand 57 on the base 1. At the other end of the quill or sleeve is fixed a disk 58 having a peripheral notch 59 and a face-pin 60. On a bracket 61, which may extend from the bearing 51, is mounted a spring-held latch-lever 62, which has an arm 63 on which is pivoted a disk 64 having a series of peripheral notches 65 of equal depth and a single notch 66 of less depth than the notches 65, and this disk turns in a plane parallel with the disk 58, so that its notches will cooperate with the pin 60. Because of its function, this notched disk 64 is herein referred to as a "timing-wheel." On the shaft 48 is fixed an arm 67 having pivotally mounted in a slot therein an L-shaped latch 68, normally held down by a spring 69 and projecting beyond the arm 67 in the direction of the disk 58, so as to engage the notch 59 in said disk to cause the disk 58 and the shaft to turn together. A spring 70 on the latch-lever 62 and pressing upon the timing wheel 64, may be used to prevent back-motion of said timing wheel.

Figure 8:
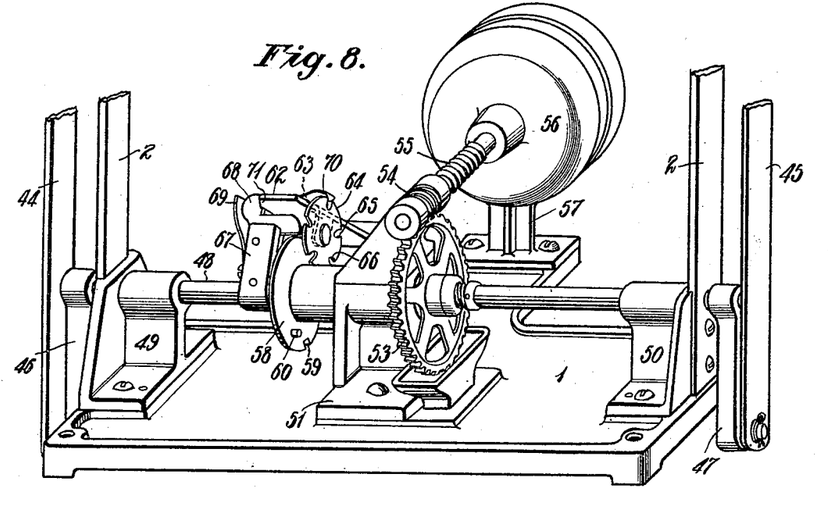
Fig. 8 is a perspective view of the driving mechanism.
Figure 9:
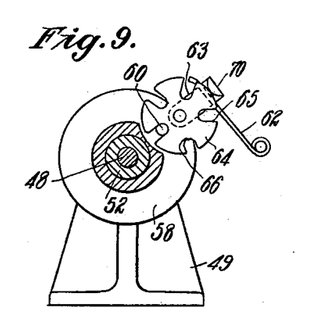
Fig. 9 is a cross-section to the left of the center bracket or bearing.
Figure 10:
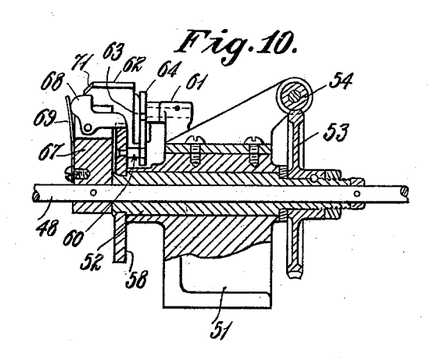
Fig. 10 is a longitudinal section along the main shaft from the worm-gearing through the escapement.

The timing-wheel 64 is here shown as provided with five notches which engage with the pin 60, and all of said notches excepting one, as stated, are of sufficient depth to allow the pin 60 as it is carried around by the disk 58 to engage the notches in the said timing wheel without changing its axis, or in other words, without raising it. The shorter notch is made sufficiently shallow that upon the said pin 60 engaging its bottom it will elevate the timing wheel and the latch lever 62, and thereupon cause the inclined edge 71 of said latch-lever 62 to move out of engagement with the latch 68, that is to say, from the position shown in Fig. 8 into the position shown in Fig. 10, and release the latch 68 which thereupon by action of its spring 69 immediately engages with the notch 59 in the disk 58. Assuming that it requires two seconds for the disk 58 to make one revolution, and that the timing wheel has four deep notches and one shallow one, then the pin 60 will mesh freely in and pass through the four longer notches in the timing wheel without changing the axis of said wheel, and the time required will be four revolutions times two seconds a revolution, or eight seconds in all, during which time the crank-shaft or main-shaft 48 remains stationary. Upon the fifth revolution of the disk 58 the pin 60 will enter the fifth or shallow notch in the timing-wheel, and not being able to pass through or out of it without interference, will cause its axis to change and in so doing elevate it and the latch lever, thereby releasing the latch 68 and causing the arm 67 to complete a revolution, at which time the latch 68 is swung out of the notch 59 by contact of the inclined edge 71 of the latch-lever 62 with the upright portion of the latch 58 as shown in Fig. 8.

Thus it will be seen that the crank-shaft or main shaft 48 will make one revolution in two seconds and remain idle eight seconds.

Obviously the duration of dwell of the crank-shaft may be altered by varying the number of notches in the timing wheel.

The disk 58, the timing wheel and the arm 67 constitute what is herein referred to as an escapement, for lack of a better name.

It will be understood that when the shaft 48 is in motion as described, the carriage is raised so as to transfer a display frame from the lower to the upper rack, and lift a display frame from said upper rack, and then lower it so as to be in readiness to elevate another display frame at the recurrence of the rotation of the crank-shaft or main-shaft, the display frame from the upper rack meanwhile being exhibited during the interval between revolutions of the main-shaft. As already explained, this period of exhibition may be increased or diminished by varying the number of notches in the timing-wheel.

The display frame racks having been supplied with a sufficient number of display frames, the carriage in its upward movement takes with it by its catches 19 one frame from the rear of the lower rack and the catches 21 take a frame from the front of the upper rack. The frame on the catches 19 is elevated substantially to a level with the upper rack where the hooks 20 receive it and hold it while the descending carriage causes the rollers 25 to ride down on the cam part 72 of said hooks and press said hooks forward and thereby transfer the frame to the upper rack. The frame on the catches 21 has also been elevated to a position where it is engaged by the hooks 22 and held for display, first causing said hooks to release the frame previously held which latter then drops into the pockets $28^x$ Figs. 2, 3, 6 and 7, of the latches 28 and 29, whence on the descent of the carriage, said frame is deposited on hooks 73 depending from the rod 4 to a point opposite the upper rack, at which time the slanting bottoms 74 of cams 36 and 37 on latches 28 and 29 wedge against the ends of the spring-pins 38 and 39 forcing said spring pins out and over the cams 36 and 37 until said pins drop over the upper angles or slanting tops 75 of said cams without disturbing the positions of the latches 28 and 29 in their relation to the carriage.

The hook 22 is normally drawn toward the front of the machine by means of a spring 76 and the hook 73 is normally drawn toward the rear of the machine by means of a spring 77, so that these hooks are normally in position to receive the display frames as they are delivered to them.

Figure 7:
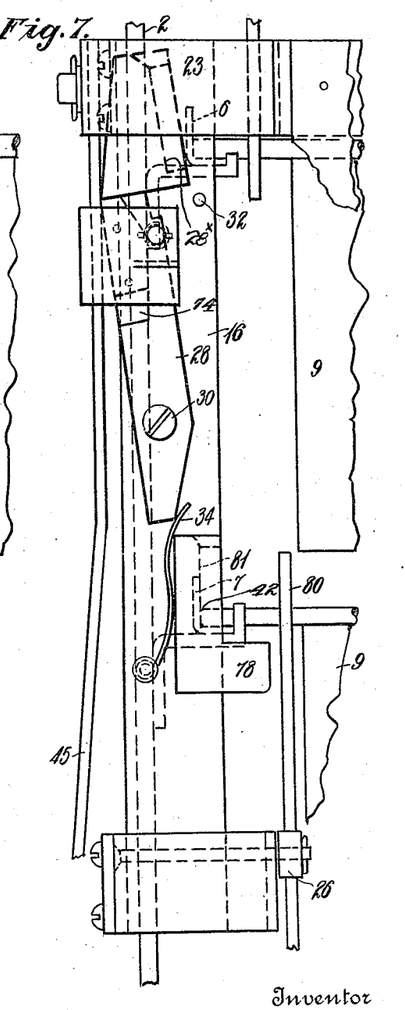
Fig. 7 is a similar view with the frame carriage elevated and discharging or releasing a frame.

The ascending carriage causes the slanting tops 75 of the cams 36 and 37 to contact with the sides of the spring pins 38 and 39 which forces the latches 28 and 29 in an outward direction, Fig. 7, thereby enabling them to clear the trunnions of the display frame for the time being hanging on the hooks 73, after which the cams 36 and 37 permit such latches to return to their normal positions against the stop pins 32 and 33.

The frame pockets 42 and 43 are rigidly attached to the carriage and have angle projections 78 and 79 which upon ascending strike against the lower angular bills or cam-like ends of the hooks 73, causing them to release the displayed frame so that it will drop, its trunnions 8 dropping into the pockets 42 and 43, after which upon the descent of the carriage the frame is carried down to the lower frame rack, at which time the rollers 26 engage the upper ends of levers 80, as shown in Fig. 4 and displace the frame on to the lower rack through slots 81, Fig. 7, provided in the front guides 16 of the carriage. The levers 80 are pivoted upon the cross rod 82 of the main frame and normally pressed toward the front of the machine by means of springs 83.

Figure 5:
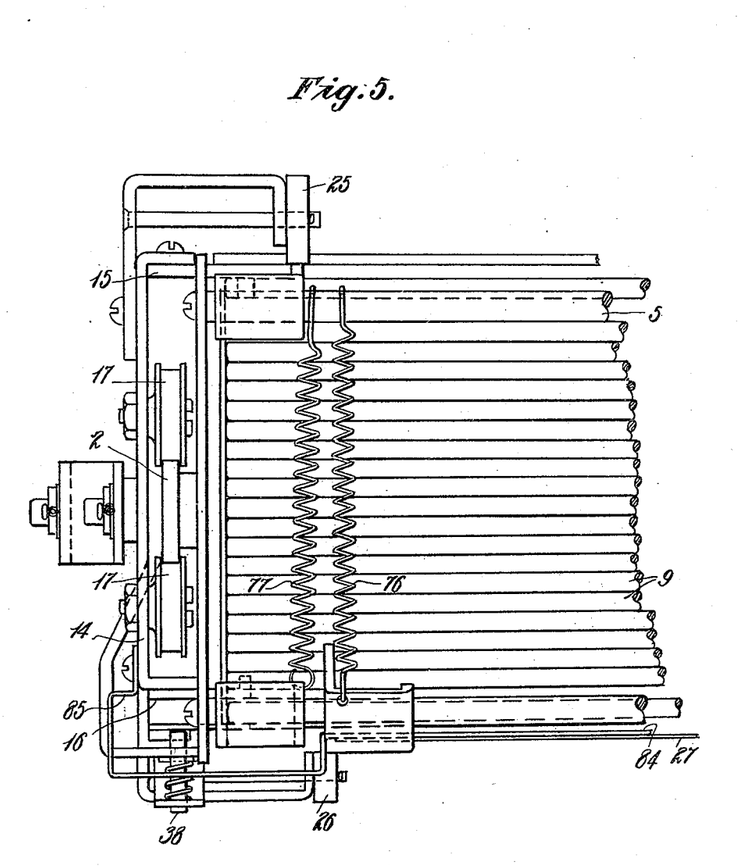
Fig. 5 is a top plan view of a fragment of one side of the machine.
Figure 6:
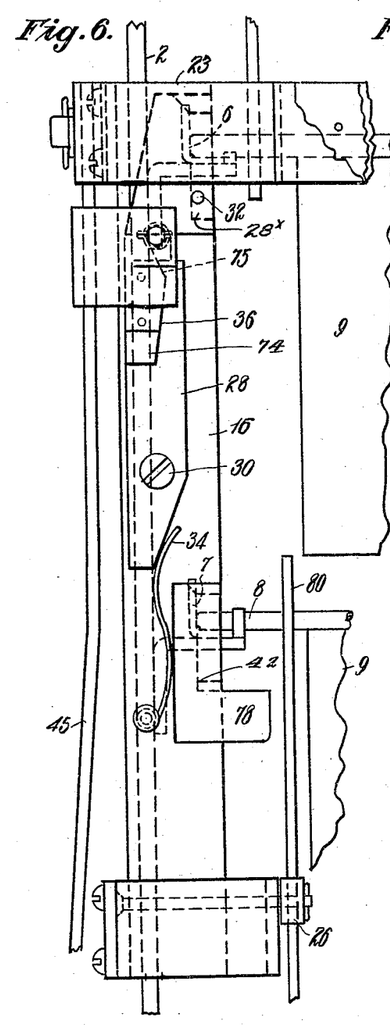
Fig. 6 is a front elevation illustrating a portion of the left-hand side of the machine the parts being shown in substantially the same position as shown in Fig. 1, to carry up an advertising frame.

Referring again to the shutter 27 and its connection with the carriage so as to travel with it always, a bar 84 has its ends 85 fastened to the upper horizontal piece 14 of the carriage, as seen in Fig. 5, and extends across the carriage, and upon this bar the shutter is fixed. This shutter may be of ornamental character or supplied with signs, advertisements or the like. This shutter conceals from view the display frame that is being moved into position behind the frame on display, and if ornamented as described serves to break the monotony of displays.

Figure 11:
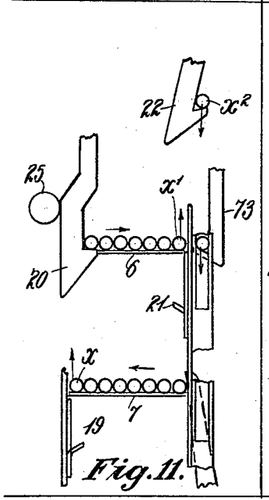
Figs. 11, 12, 13, 14, 15 and 16 are diagrammatic views showing the movements of the display frames.
Figure 12:
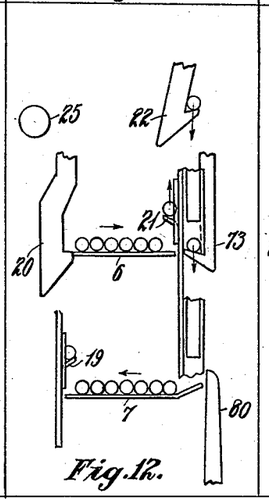
Figure 13:
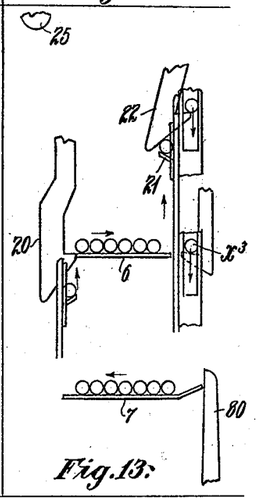
Figure 14:
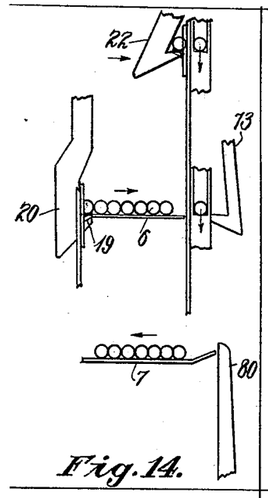
Figure 15:
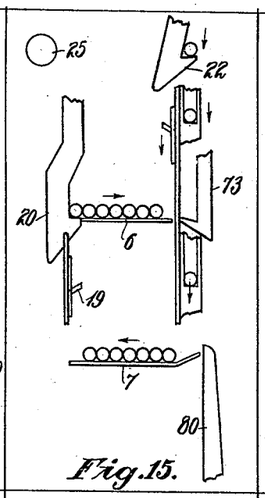
Figure 16:
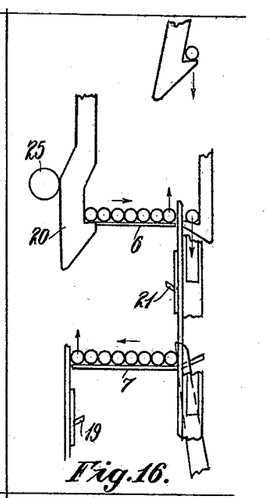

In the preceding explanation, the operation of the machine is indicated, but in order to emphasize the automatic operation of the machine and the movement of the display frames and shutter, reference is made to Figs. 11 to 16 inclusive, in connection with the following:—Assuming the parts to be as shown in Fig. 11, and the carriage having started upward, the lifting catches 19 will engage the trunnions of the frame $x$ and carry it up with it until said frame engages the cam-like ends of the hooks 20 and displaces the hooks to the left until the catches have lifted this particular display frame to the position shown in Fig. 14, at which time the hook 20 moves to the right and engages the trunnions of the frame until the carriage has returned to the position shown in Fig. 11, when the carriage rollers 25 have rolled down over the cam portion 72 of the hook and compelled said hook to transfer the frame to the upper rack and move it and all the forward frames to the right or front, thus closing the space previously occupied by the front frame $x^1$. Inasmuch as the catches 21 have been moved upward also, they have engaged the frame $x^1$ at the front of the upper rack and the trunnions of this frame coming into contact with the hooks 22, cause said hooks to move to the left, as shown in Fig. 14, thereby dropping the frame $x^2$ previously held therein into the pockets of the latches 28 and 29, at which time the hooks 22 capture the frame $x^1$ and support it while the frame $x^2$ is descending, and at this time the hooks are moved to the right or display position shown in Fig. 16 and the frame $x^2$ descending with the carriage is captured by the hooks 73, as shown in Fig. 16. The pockets 42 and 43 moving upward as shown in Fig. 13 push the hook 73 to the right and receive from it the frame $x^3$ and in descending deposit the frame on the inclined end of the lower rack and thereupon the levers 80 move to the left and push the frame and all preceding frames to the left and into the positions shown in Figs. 11 and 16.

Fig. 12 shows the positions of parts after the catches 19 and 21 have removed the frames from the racks, and Fig. 15 shows the positions of parts after the removed frames are pocketed in the front pockets. In Fig. 12 all of the frames are at rest excepting the one in the rear on the lower rack, and the frame in front on the upper rack, and these are moving upward with the carriage. In Fig. 15 all of the frames are at rest excepting that one which is in the pockets and which had been previously released from hooks 73 and is descending to the lower rack.

As will be observed, the display frames and the racks will be placed in display position successively and will be held in such display position while the carriage is at rest.

Variations in the details of construction and arrangement of parts are permissible within the principle of the invention as herein explained and hereinafter claimed.

What I claim is:—

1. In a display machine, having a plurality of display racks on which display frames are movably suspended, a vertically movable carriage provided with catches adapted to transfer the rearmost frame of a lower rack to the rear of an upper rack, and similar catches adapted to transfer the foremost frame from an upper rack to a display position, and means to release the previously displayed frame.

2. In a display machine, having a plurality of display racks on which display frames are movably suspended, a vertically movable carriage provided with catches adapted to transfer the rearmost frame of a lower rack to the rear of an upper rack, and similar catches adapted to transfer the foremost frame from an upper rack to a display position, means to release the previously displayed frame, and means to transfer said previously displayed frame to a lower rack.

3. In a display machine, having a plurality of display racks on which display frames are movably suspended, a vertically movable carriage provided with catches adapted to transfer the rearmost frame of a lower rack to the rear of an upper rack, and similar catches adapted to transfer the foremost frame from an upper rack to a display position, and means to release said previously displayed frame, combined with a continuously moving carriage operating mechanism having an escapement which permits the carriage to move once in any given number of revolutions of the operating mechanism to thereby hold the frame in display position for a predetermined period.

4. In a display machine, a stationary frame provided with stationary racks adapted to support the display frame loosely, a vertically movable carriage arranged to travel periodically up and down said frame and having catches arranged at the back and at the front which are adapted to engage the rearmost and foremost frames on the respective racks and to lift them from such racks, means to transfer the rearmost frame from the lower rack to the rear of the upper rack and means to remove the foremost frame of the upper rack from such rack, and means to take the frame removed from the upper rack and transfer it to a display position, means to displace the previously displayed frame, and means to transfer such displaced frame to the lower rack, the carriage serving to automatically operate the several transfer agencies.

5. In a display machine, a frame having vertical lateral uprights and transverse members mounted thereon and connected from side to side, a plurality of stationary racks fixed to said uprights and adapted to receive series of display frames, a carriage mounted for vertical up and down movement on said uprights, so as to pass said racks, catches arranged on said carriage at its rear and at its front and at different altitudes substantially equal to the distance between adjacent racks and adapted in the upward movement of the carriage to remove display frames from the respective racks and elevate them, and means operated by the moving carriage to transfer the display frame at the rear to the upper rack and the display frame at the front into display position.

6. In a display machine, a frame having vertical lateral uprights and transverse members mounted thereon and connected from side to side, a plurality of stationary racks fixed to said uprights and adapted to receive series of display frames, a carriage mounted for vertical up and down movement on said uprights, so as to pass said racks, said carriage having front and rear catches arranged thereon at different altitudes, hooks depending from the upper part of the machine to the upper rack at the rear and adapted to displace the display frame from the rear catches, hooks depending from the front of the frame and adapted to displace the frame from the front catches, hooks depending from the front of the frame to the upper rack, and means on the carriage to actuate said hooks to effect the transfer of the frames.

7. In a display machine, a frame having vertical lateral uprights and transverse members mounted thereon and connected from side to side, a plurality of stationary racks fixed to said uprights and adapted to receive series of display frames, a carriage mounted for vertical up and down movement on said uprights, so as to pass said racks, said carriage having front and rear catches arranged thereon at different altitudes, hooks depending from the upper part of the machine to the upper rack at the rear and adapted to displace the display frame from the rear catches, hooks depending from the front of the frame and adapted to displace the frame from the front catches, hooks depending from the front of the frame to the upper rack, and means on the carriage to actuate said hooks to effect the transfer of the frames, levers pivotally mounted near the lower end of the uprights and extending into the carriage and rising slightly above the lower rack, and means on said carriage to force said levers toward the lower rack at predetermined times to transfer display frames to the lower rack at its front.

8. In a display machine, a frame having vertical lateral uprights and transverse members mounted thereon and connected from side to side, a plurality of stationary racks fixed to said uprights and adapted to receive series of display frames, a carriage mounted for vertical up and down movement on said uprights, so as to pass said racks, said carriage having front and rear catches arranged thereon at different altitudes, hooks depending from the upper part of the machine to the upper rack at the rear and adapted to displace the display frame from the rear catches, hooks depending from the front of the frame and adapted to displace the frame from the front catches, hooks depending from the front of the frame to the upper rack, and means on the carriage to actuate said hooks to effect the transfer of the frames, levers pivotally mounted near the lower end of the uprights and extending into the carriage and rising slightly above the lower rack and means on said carriage to force said levers toward the lower rack at predetermined times to transfer display frames to the lower rack at its front, and pockets on the carriage for the temporary reception of the transferred display frame.

9. In a display machine, having a plurality of display racks on which display frames are movably suspended, a vertically movable carriage provided with catches adapted to remove a frame from a rack, latches pivoted to said carriage at opposite sides and provided with pockets to temporarily receive a removed display frame, and means to actuate said latches to release the thus received frame.

10. In a display machine having a plurality of display racks on which display frames are movably suspended, a vertically movable carriage provided with catches adapted to remove a frame from a rack, latches pivoted to said carriage at opposite sides and provided with pockets to temporarily receive a removed display frame, said latches provided with cam blocks, and spring pins fixed to the uprights and projecting in the path of movement of the cam blocks on the latches.

11. In a display machine, having a plurality of display racks on which display frames are movably suspended, a vertically movable carriage provided with catches adapted to remove a frame from a rack, latches pivoted to said carriage at opposite sides and provided with pockets to temporarily receive a removed display frame, means to move said latches to release the thus received frame, and means to return said latches to receiving position.

12. In a display machine, having a plurality of display racks on which display frames are movably suspended, a vertically movable carriage provided with catches adapted to remove a frame from a rack, latches pivoted to said carriage at opposite sides and provided with pockets to temporarily receive a removed display frame, means to rock said latches on their pivots to release the thus received frame, and springs to return said latches to their receiving position.

13. In a display machine, a frame provided with a plurality of stationary racks which are adapted to receive series of display frames, a carriage mounted upon said frame and adapted to move up and down on the same so as to pass said racks, said carriage having front catches adapted to displace a display frame from the adjacent rack, hooks depending from the upper part of the machine at the front to displace the displayed frame from said catches, pockets on the carriage into which the displayed frame is displaced, and projections on the carriage adapted to move said hooks so as to release the displayed frame when dropped into said pockets.

14. In a display machine, a frame provided with a plurality of stationary racks which are adapted to receive series of display frames, a carriage mounted upon said frame and adapted to move up and down on the same so as to pass said racks, said carriage having front catches adapted to displace a display frame from the adjacent rack, hooks depending from the upper part of the machine at the front to displace the displayed frame from said catches, pockets on the carriage into which the displayed frame is displaced from the hooks and projections on the carriage adapted to move said hooks so as to release the displayed frame for dropping it into said pockets, other hooks depending from the upper part of the machine at the front and levers fixed to the machine frame and engaged by the moving carriage to transfer the display frame from said pocket to the adjacent rack.

15. In a display machine, a frame provided with racks adapted to receive display frames, a carriage mounted on the machine frame adapted to travel by said racks to take the frames one by one from them for display purposes, and a carriage operating mechanism comprising a shaft, a crank arm fixed to said shaft, a disk mounted loosely on said shaft and provided with a notch and a pin, means to rotate said disk independently of the shaft, a latch on the crank arm adapted to engage said notch at predetermined intervals, a latch lever carrying a timing wheel having a series of notches adapted to engage the pin on the disk and be turned thereby and an additional notch of less depth than the other notches adapted to engage said pin and cause the latch lever to be lifted to permit the latch to engage the notch in the disk and cause said shaft to turn, and means connected with the shaft to reciprocate the carriage.

16. In a display machine, a frame provided with racks adapted to receive display frames, a carriage mounted on the machine frame adapted to travel by said racks to take the frames one by one from them for display purposes, and a carriage operating mechanism comprising a shaft, a crank arm fixed to said shaft, a sleeve loosely mounted on said shaft and provided with a disk having a notch and a pin, means to rotate said sleeve and disk independently of the shaft, a latch on the crank arm adapted to engage said notch at predetermined intervals, a latch lever carrying a timing wheel having a series of notches adapted to engage the pin on the disk and be turned thereby and an additional notch of less depth than the other notches adapted to engage said pin and lift the latch lever to permit the latch to engage the notch in the disk and cause said shaft to turn, and means connected with the shaft to reciprocate the carriage as the shaft turns.

17. In a display machine for displaying or exhibiting advertisements and other objects, a frame, a carriage reciprocating on said frame adapted to place and displace the displayable objects, and a shutter mounted upon and carried by the carriage.

18. In a display machine for displaying or exhibiting advertisements and other objects, a frame, a carriage reciprocating on said frame adapted to place and displace the displayable objects, a rigid bar fixed to and traveling with the carriage and a shutter fixed to said bar and adapted to conceal the movement of the displayable object into display position.

19. In a display machine for displaying or exhibiting advertisements and other objects, a frame, racks on said frame, display frames mounted on said racks, a carriage reciprocating on said frame and adapted to place and displace the display frames, and a shutter fixed to and moving with the carriage.

In testimony whereof I have hereunto set my hand this 11th day of September, A. D. 1920.

OREN F. BALTZLEY.

Witnesses:
R. E. FLEMING,
IRA L. STOVER.

Certificate of Correction.

It is hereby certified that in Letters Patent No. 1,409,516, granted March 14, 1922, upon the application of Oren F. Baltzley, of Hagerstown, Maryland, for an improvement in "Display Machines," errors appear in the printed specification requiring correction as follows: Page 2, line 10, for the syllable "ad-" read *ar-;* same page, strike out present lines 12 and 13 and insert *the carriage is lifted, the latches 28 and 29 are caused to move outwardly by means;* page 3, line 64, for the word "piece" read *pieces;* and that the said Letters Patent should be read with these corrections therein that the same may conform to the record of the case in the Patent Office.

Signed and sealed this 16th day of May, A. D., 1922.

[SEAL.] KARL FENNING,
*Acting Commissioner of Patents.*